No. 774,306. PATENTED NOV. 8, 1904.
E. BRULEY.
FENCE POST.
APPLICATION FILED MAR. 22, 1904.
NO MODEL.

Witnesses
Forrest L. Smith
C. H. Gresbauer

Inventor
Emery Bruley
by H. R. Willson
Attorney

No. 774,306. Patented November 8, 1904.

UNITED STATES PATENT OFFICE.

EMERY BRULEY, OF NEILLSVILLE, WISCONSIN.

FENCE-POST.

SPECIFICATION forming part of Letters Patent No. 774,306, dated November 8, 1904.

Application filed March 22, 1904. Serial No. 199,449. (No model.)

*To all whom it may concern:*

Be it known that I, EMERY BRULEY, a citizen of the United States, residing at Neillsville, in the county of Clark and State of Wisconsin, have invented certain new and useful Improvements in Fence-Posts; and I do declare the following to be a full, clear, and exact description of the invention, such as will enable others skilled in the art to which it appertains to make and use the same.

My invention relates to improvements in fence-posts of that class having bases adapted to be screwed into the ground.

The object of my invention is to provide a simple, durable, and comparatively inexpensive device of this character which may be readily secured in the ground and which will be firmly held in the desired position.

With this and other objects in view the invention consists of certain novel features of construction, combination, and arrangement of parts, as will be more fully described, and particularly pointed out in the appended claims.

Figure 1:
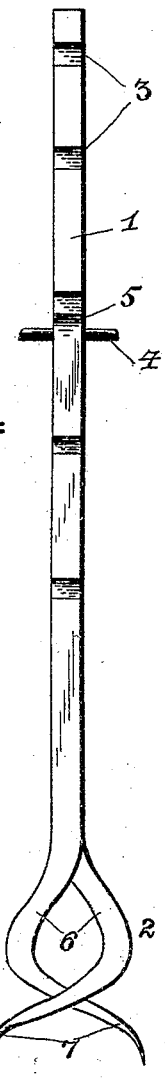
Figure 2:
Figure 3:
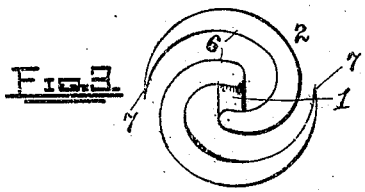
Figure 4:
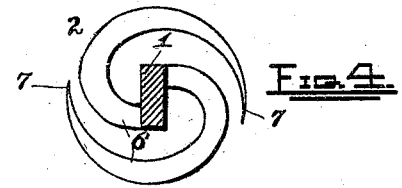

In the accompanying drawings, Figure 1 is a front or end elevation of a fence-post embodying my invention. Fig. 2 is a side elevation of the same. Fig. 3 is a bottom plan view of the screw end or base of the post. Fig. 4 is a horizontal sectional view through the post, taken on the line 4 4 of Fig. 1.

Referring to the drawings by numerals, 1 denotes the post proper, and 2 its screw-base. The post 1 is preferably in the form of a metal bar rectangular in cross-section, as shown, and formed along one of its faces with a vertical series of angularly-disposed kerfs or slots 3, in which the fence-wires 4 are inserted and retained by bending the lips 5, formed by said kerfs or slots, inwardly, so as to bind the wires. The screw-base 2 is preferably formed integral with the post 1 and comprises two spiral prongs 6, which project from opposite ends of the lower end of the post and curve outwardly and downwardly in opposite directions, as shown. Said prongs taper gradually from their upper ends where they leave the post to their lower ends 7, which are pointed, as shown, to permit them to readily enter the ground. Each prong makes a turn or curve slightly greater than that of a semicircle, and they gradually diverge from each other—that is, the space between them gradually increases from their upper ends to their lower ends or points 6. By spreading the prongs in this manner they will engage the ground more firmly and securely.

The post may be readily screwed into the ground by means of an ordinary wrench or any suitable instrument, as will be readily understood, and when inserted will be held firmly and securely in an upright position.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A metallic fence-post consisting of a flat metal bar provided with a screw-base, said base consisting of two gradually-tapered spirally-curved prongs extending in opposite directions from opposite edges of the lower end of the post and diverging gradually from each other from their upper to their lower pointed ends, whereby the post when screwed into the ground is provided with an anchor of greater width at its terminal lower end, substantially as described.

2. A fence-post consisting of a flat rectangular metal bar provided at its lower end with a prong extending from each of its opposite edges, said prongs being rounded in cross-section and extending spirally in opposite directions and gradually diverging from each other from their upper to their lower pointed ends, thus providing an anchor for said post of greater area at its lower end, substantially as described.

In testimony whereof I have hereunto set my hand in presence of two subscribing witnesses.

EMERY BRULEY.

Witnesses:
ROBERT J. MACBRIDE,
JOSEPH MORLEY.